(12) United States Patent
Dunning et al.

(10) Patent No.: US 11,618,585 B2
(45) Date of Patent: Apr. 4, 2023

(54) INTEGRATED SYSTEM FOR IMPROVED VEHICLE MAINTENANCE AND SAFETY

(71) Applicant: GE AVIATION SYSTEMS LIMITED, Gloucestershire (GB)

(72) Inventors: Paul Dunning, Eastleigh (GB); Steven Bonnett, Eastleigh (GB); Timothy North, Eastleigh (GB); Daniel Lee, Eastleigh (GB)

(73) Assignee: GE AVIATION SYSTEMS LIMITED, Gloucestershire (GB)

( * ) Notice: Subject to any disclaimer, the term of this patent is extended or adjusted under 35 U.S.C. 154(b) by 110 days.

(21) Appl. No.: 16/599,103

(22) Filed: Oct. 10, 2019

(65) Prior Publication Data
US 2021/0107679 A1  Apr. 15, 2021

(51) Int. Cl.
*G07C 5/08* (2006.01)
*B64D 45/00* (2006.01)

(52) U.S. Cl.
CPC ........... *B64D 45/00* (2013.01); *G07C 5/0841* (2013.01); *B64D 2045/0065* (2013.01); *B64D 2045/0085* (2013.01)

(58) Field of Classification Search
None
See application file for complete search history.

(56) References Cited

U.S. PATENT DOCUMENTS

| 6,397,128 | B1 * | 5/2002 | Todd ..................... B64D 45/00 340/945 |
| 7,098,811 | B2 | 8/2006 | Augustin et al. |
| 7,984,146 | B2 | 7/2011 | Rozak et al. |
| 8,131,420 | B2 | 3/2012 | Lynch et al. |

(Continued)

FOREIGN PATENT DOCUMENTS

| CA | 2393828 A1 * | 6/2001 | ............. G06F 9/545 |
| CA | 2781029 A1 * | 12/2012 | ........... G07C 5/0808 |

(Continued)

OTHER PUBLICATIONS

European Search Report from EP Appl. No. 20 19 6301, dated Oct. 23, 2020.

(Continued)

*Primary Examiner* — James J Lee
*Assistant Examiner* — Tawri M Matsushige
(74) *Attorney, Agent, or Firm* — Wood IP LLC

(57) ABSTRACT

A system and method relates to analysing data indicative of system performance for a vehicular transport system. More particularly, the present invention relates to integrating aircraft management, monitoring, and maintenance systems, such as Health & Usage Monitoring/Management Systems (HUMS), On-board Maintenance Systems (OMS), Cockpit Voice & Flight Data Recorders (CVFDR), and/or Quick Access Recorder (QAR) previously distributed over multiple systems, into a single circuit card assembly (CCA). The single circuit card may consist of the electronics needed for data acquisition, processing, storage and transmission to support all of the above systems and similar. The present system and method is further related to running the software to perform aircraft management, monitoring, and maintenance functions on the single common CCA.

15 Claims, 9 Drawing Sheets

(56) References Cited

U.S. PATENT DOCUMENTS

| | | |
|---|---|---|
| 8,151,024 B2 | 4/2012 | Nigoghosian et al. |
| 8,200,442 B2 | 6/2012 | Adams et al. |
| 8,402,844 B2 | 3/2013 | Zakrzewski et al. |
| 8,682,509 B2 | 3/2014 | Goodrich et al. |
| 8,868,284 B2 | 10/2014 | Isom et al. |
| 8,909,453 B2 | 12/2014 | Wendelsdorf et al. |
| 8,914,205 B2 | 12/2014 | Chandran et al. |
| 8,983,712 B2 | 3/2015 | Isom et al. |
| 9,091,616 B2 | 7/2015 | Moeckly et al. |
| 9,102,419 B2 | 8/2015 | Green et al. |
| 9,169,027 B2 | 10/2015 | Strauss et al. |
| 9,240,083 B2 | 1/2016 | Isom et al. |
| 2002/0018716 A1 | 2/2002 | Kennedy et al. |
| 2004/0176902 A1 | 9/2004 | McBrien et al. |
| 2005/0149238 A1 | 7/2005 | Stefani et al. |
| 2005/0151672 A1 | 7/2005 | Augustin et al. |
| 2008/0036617 A1 | 2/2008 | Arms et al. |
| 2008/0151883 A1 | 6/2008 | Cockerell et al. |
| 2009/0083050 A1 | 3/2009 | Eltman et al. |
| 2009/0157255 A1 | 6/2009 | Plante |
| 2009/0211381 A1 | 8/2009 | Bechhoefer |
| 2009/0216398 A1 | 8/2009 | Lynch et al. |
| 2010/0042283 A1* | 2/2010 | Kell ............... G06Q 10/0875 705/29 |
| 2010/0057277 A1 | 3/2010 | Goodrich et al. |
| 2010/0063654 A1* | 3/2010 | Winterhalter ............ G01S 5/18 701/14 |
| 2010/0152919 A1 | 6/2010 | Davidson et al. |
| 2010/0219987 A1 | 9/2010 | Isom et al. |
| 2010/0235108 A1 | 9/2010 | Adams et al. |
| 2010/0235109 A1 | 9/2010 | Zhao et al. |
| 2010/0308794 A1 | 12/2010 | Townsend et al. |
| 2011/0054721 A1 | 3/2011 | Goodrich |
| 2011/0112878 A1 | 5/2011 | Isom et al. |
| 2011/0264310 A1 | 10/2011 | Bates et al. |
| 2011/0313726 A1 | 12/2011 | Parthasarathy et al. |
| 2012/0041636 A1 | 2/2012 | Johnson et al. |
| 2012/0203419 A1 | 8/2012 | Tucker et al. |
| 2013/0046714 A1 | 2/2013 | Harris |
| 2013/0184959 A1 | 7/2013 | Wendelsdorf et al. |
| 2013/0211737 A1 | 8/2013 | Batcheller et al. |
| 2013/0274989 A1 | 10/2013 | Isom et al. |
| 2014/0114527 A1 | 4/2014 | Goodrich et al. |
| 2014/0178175 A1 | 6/2014 | Kalkovich et al. |
| 2014/0277923 A1* | 9/2014 | Kaufmann ............ B64D 25/20 701/33.4 |
| 2015/0100181 A1 | 4/2015 | Strauss et al. |
| 2015/0363981 A1* | 12/2015 | Ziarno ................. G07C 5/0841 701/101 |
| 2016/0083085 A1 | 3/2016 | Strauss et al. |
| 2016/0083104 A1 | 3/2016 | Simonetti et al. |
| 2016/0196698 A1* | 7/2016 | O'Dell .................. G07C 5/008 701/33.4 |
| 2016/0340058 A1* | 11/2016 | Da Silva .............. G07C 5/0808 |
| 2016/0364920 A1 | 12/2016 | Nelson et al. |
| 2016/0368378 A1 | 12/2016 | Berenbaum et al. |
| 2017/0011560 A1* | 1/2017 | Sheldon ................... G07C 5/00 |
| 2017/0034214 A1 | 2/2017 | Houser et al. |
| 2017/0186249 A1* | 6/2017 | Bandy ................. G07C 5/0808 |
| 2018/0350165 A1* | 12/2018 | Moravek .................. B64F 5/60 |
| 2019/0213263 A1 | 7/2019 | Baggeroer et al. |
| 2019/0213285 A1 | 7/2019 | Baggeroer et al. |
| 2019/0215338 A1 | 7/2019 | Baggeroer et al. |

FOREIGN PATENT DOCUMENTS

| | | |
|---|---|---|
| CN | 107074375 A | 8/2017 |
| EP | 0407179 A1 | 1/1991 |
| EP | 1940069 A2 | 7/2008 |
| EP | 1444491 B1 | 4/2009 |
| EP | 2226766 A2 | 9/2010 |
| EP | 2230638 A2 | 9/2010 |
| EP | 2333726 A1 | 6/2011 |
| EP | 1940069 B1 | 10/2011 |
| EP | 2384971 A1 | 11/2011 |
| EP | 1485892 B1 | 10/2012 |
| EP | 2384971 B1 | 5/2013 |
| EP | 2641832 A2 | 9/2013 |
| EP | 2660677 A2 | 11/2013 |
| EP | 2671797 A2 | 12/2013 |
| EP | 2991044 A1 | 3/2016 |
| EP | 2660677 B1 | 6/2016 |
| EP | 2641832 B1 | 7/2016 |
| EP | 3107045 A1 | 12/2016 |
| GB | 2233798 | 1/1991 |
| KR | 101583067 | 1/2016 |
| WO | 2003056284 A2 | 7/2003 |
| WO | 03056284 03081554 A1 | 10/2003 |
| WO | 2007130587 A2 | 11/2007 |
| WO | 2008077228 A1 | 7/2008 |
| WO | 2008101167 A2 | 8/2008 |
| WO | 2009042356 A2 | 4/2009 |
| WO | 2009085476 A1 | 7/2009 |
| WO | 2011048380 A1 | 4/2011 |
| WO | 2011163316 A2 | 12/2011 |
| WO | 2013120103 A1 | 8/2013 |
| WO | 2014082616 A2 | 11/2014 |
| WO | 2015131193 A1 | 9/2015 |
| WO | 2015153845 A1 | 10/2015 |
| WO | 2015160945 A1 | 10/2015 |
| WO | 2015176055 A1 | 11/2015 |
| WO | 2016092475 A1 | 6/2016 |
| WO | 2016148771 A1 | 9/2016 |
| WO | WO-2017118670 A2 * | 7/2017 ............. B64D 45/00 |

OTHER PUBLICATIONS

"Dot/FAA/AR-09/38 Health and Usage Monitoring System Functional Assessment—Goodrich Health and Usage Management System, Final Report " Air Traffic Organization NextGen & Operations Planning Office of Research and Technology Development, Washington, DC 20591, U.S. Department of Transportation, Federal Aviation Administration, Sep. 2010, 29 pages, http://www.tc.faa.gov/its/worldpac/techrpt/ar0938.pdf.

* cited by examiner

INTEGRATED SYSTEM FOR IMPROVED VEHICLE MAINTENANCE AND SAFETY

I. FIELD OF THE INVENTION

The present invention relates to assessing system performance for a vehicular transport system. More particularly, the present invention relates to integrating aircraft management, monitoring, and maintenance systems, which have been previously distributed over multiple systems, into a single circuit card assembly (CCA). The present invention is further related to running the software to perform aircraft management, monitoring, and maintenance functions on the single common CCA.

II. BACKGROUND OF THE INVENTION

Modern transport vehicles (hereinafter, "vehicles") include helicopters, airplanes, cars, trucks, boats and trains. It is common for vehicles to include electronic sensors to monitor both the performance and the environment of a vehicle. A sensor may record data indicative of: the environment impinging on or surrounding the vehicle; internal operations of parts of the vehicle; or data which is influenced by both external environment and internal operations. Commonly used sensors may monitor vehicle and/or vehicle component motions, vibrations, velocities, temperatures, torques, liquid or gas pressures, liquid or gas volumes, concentrations of gases or liquids, electrical performance and parameters, and others as well.

The data obtained via parameter-specific sensors may be used for multiple purposes. For example, a sensor may monitor real-time performance of a vehicle component to ensure a component is operating within safe or appropriate parameters (for example, for heat, pressure, electrical performance, and similar). Where variations from expected performance ranges are detected by a sensor, a hardware processor with suitable code may be used to adjust operations of the vehicle to correct for problems. In the simplest cases, monitoring (with suitable displays) may simply alert an operator of a vehicle to changes in vehicle conditions, such as changes in vehicle speed or fuel levels, leaving appropriate responses to the determination of the vehicle operator.

Another use of collected sensor data is for after-the-fact analysis of vehicle performance. After-the-fact analysis may be used to help with the development of vehicle prototypes during a vehicle design process. In other cases such data, when analyzed over time, may provide early-alert warnings to potential or pending problems for the vehicle.

Another application of sensor data is when the vehicle encounters unexpected problems or environments, or when the vehicle exhibits unexpected behaviours or performance, Sensor data may then be used to analyze and assess vehicle performance after-the-fact. Such post-problem analysis, usually performed by researchers and/or computers some time after an event has occurred, helps identify either the nature of unexpected stresses to which a vehicle was exposed; or unanticipated responses of the vehicle to various environment factors/stresses; or both.

One well-known application of vehicle sensor data in aircraft is in the flight recorders (so-called "black boxes", which in fact are typically painted orange to help in recovering them after accidents). A flight recorder is a data processing and storage device which collects and may partially process data from numerous sensors aboard an aircraft. Flight recorders are typically designed with robust mechanical structure to be highly survivable following even a catastrophic plane crash or other serious incident.

More generally, a vehicle's sensing/monitoring system (VSMS) is formed of two or more unique maintenance and/or safety systems that are already fitted to many vehicles, including in particular but not limited to) aircraft, such as airplanes and helicopters. These maintenance and/or safety systems will typically entail the use of multiple Data Acquisition and Processing Units (DAPUs), which each collect and process data from various sensors. Exemplary DAPUs may include, for example and without limitation:

(1) Crash-Survivable Cockpit Voice & Flight Data Recorder (CVFDR)
(2) On-board Maintenance System (OMS)
(3) Quick Access Recorder (QAR)
(4) Health & Usage Monitoring/Management System (HUMS).

These are discussed further below.

For example, a health and usage monitoring system (HUMS) is fitted to machinery primarily in order to give advanced warning of impending failures. In helicopter applications of a HUMS, these systems perform data acquisition, processing, storage and transmission, using both dedicated sensors (such as accelerometers) added to the aircraft and from existing infrastructure/avionics on the aircraft (such as ARINC 429 digital data-busses). Typical HUMS functions include: vibration health monitoring (VHM) of portions of a helicopter HUMS, parameter limit exceedance detection, flight regime recognition, and data recording and display.

For another example of a DAPU, a QAR is typically a device that receives data over a digital interface (e.g. RS-422, ARINC 429, Ethernet) and records it in an industry standard format (e.g. ARINC 717 or 767 for aviation) to a removable media device (e.g. SD card).

For another example of a DAPU, an on-board maintenance system (OMS) is fitted to aid in the maintenance of the vehicles, primarily aiming to reduce the maintenance burden of maintaining the aircraft. In fixed wing aircraft applications, an OMS typically interfaces over digital databus(es) to other member systems (avionics LRUs) to record maintenance data, upload software and data, and perform fault tree reduction/root cause analysis based on fault messages returned from the member systems. The ARINC standard 624 defines the typical functions of an OMS.

For another example of a DAPU, CVFDRs are fitted to aircraft (fixed wing and rotary) to record key data in a crash survivable media to aid in crash investigations. The performance of a CVFDR can be defined by the Minimum Operational Performance Specification (MOPS) ED-112.

These exemplary DAPU systems and similar systems already have many proven and documented benefits to vehicle safety and maintenance. However, to date, these systems have been offered as multiple separate systems (for example, four separate DAPU systems) on the vehicle. In many instances these separate systems entail redundant hardware and processing.

III. SUMMARY OF EMBODIMENTS OF THE INVENTION

Given the aforementioned deficiencies, a need exists for a system that combines these DAPU functions into one integrated sensing system (ISS), and in an embodiment one circuit card assembly (CCA) (with the exception of the crash protected memory (CPM) device for a CVFDR that is separate to the CCA but physically connected). Such an ISS offers many benefits to the vehicle operators and/or manufacturers.

Most DAPUs (HUMS, OMS, CVFDR, QAR, and possibly others) will each have certain functional elements which are the same or substantially similar. These may include, for example and without limitation, power supplies, processors, interfaces to aircraft sensors, interfaces to aircraft control and display panels, and interfaces to off-craft communications networks. Because each vehicle typically employs multiple DAPUs, each with its own hardware elements, some hardware elements may be needlessly duplicated. Some software processing functions may be needlessly duplicated as well.

Embodiments of the present invention, under certain circumstances, entail combining into one element, such as one circuit card, elements which would normally be repeated across separate circuit cards of separate DAPUs. Similarly, software processes which in existing configurations are repeated redundantly may instead be integrated as a single process, or fewer processes, on-board a single circuit card.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Advantageous designs of embodiment of the present invention result from independent and dependent claims, the description, and the drawing. In the following, preferred examples of embodiments of the invention are explained in detail with the aid of the attached drawings. The drawings, which are incorporated herein and form part of the specification, illustrate the present invention and, together with the description, further serve to explain the principles of the invention and to enable a person skilled in the relevant art(s) to make and use the invention.

Figure 4:
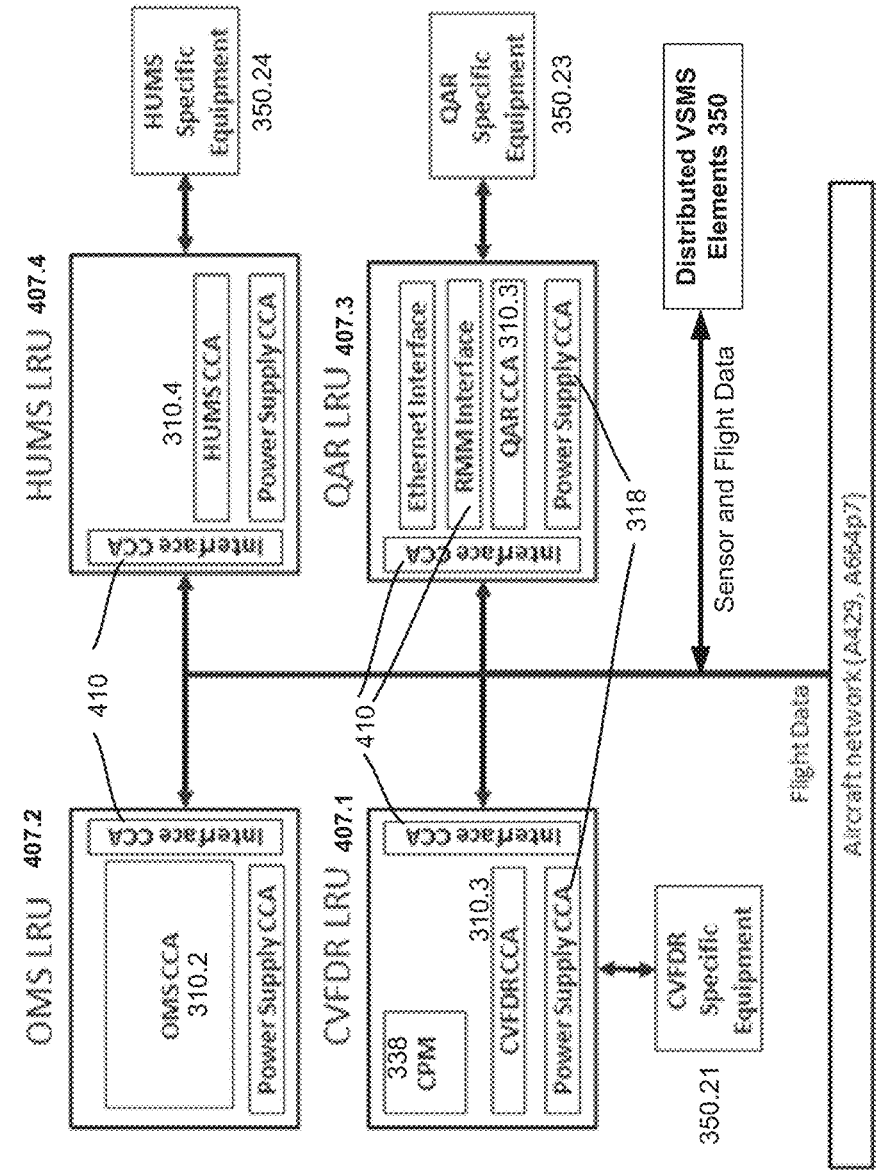

FIG. 4 provides a block diagram of four separate Data Acquisition and Processing Units (DAPUs) implemented as four separate Line Replaceable Units (LRUs) as part of a VSMS, according to an exemplary legacy system and method.

Figure 5:
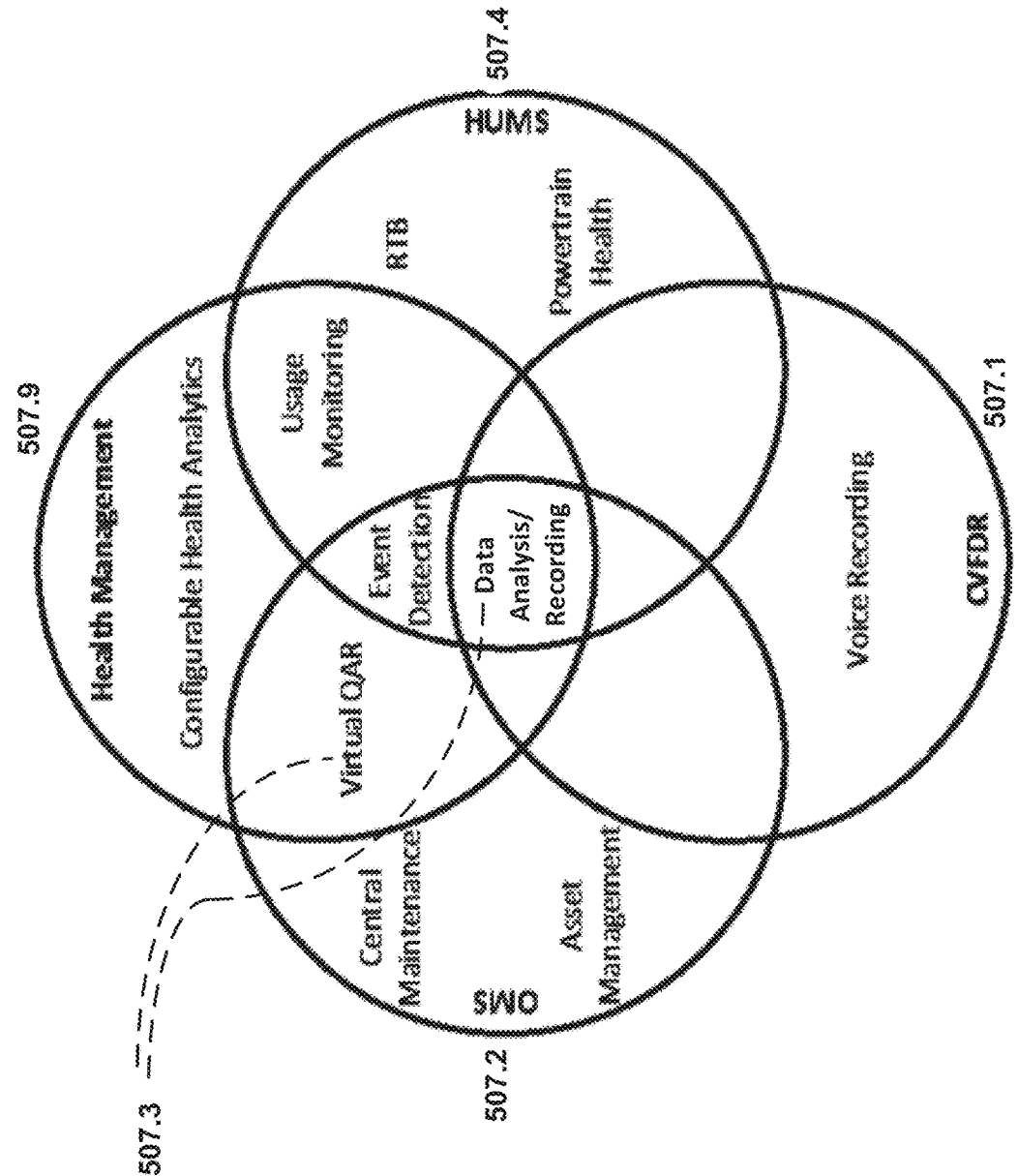

FIG. 5 illustrates typical vehicle health management functions supported by DAPUs.

Figure 6:
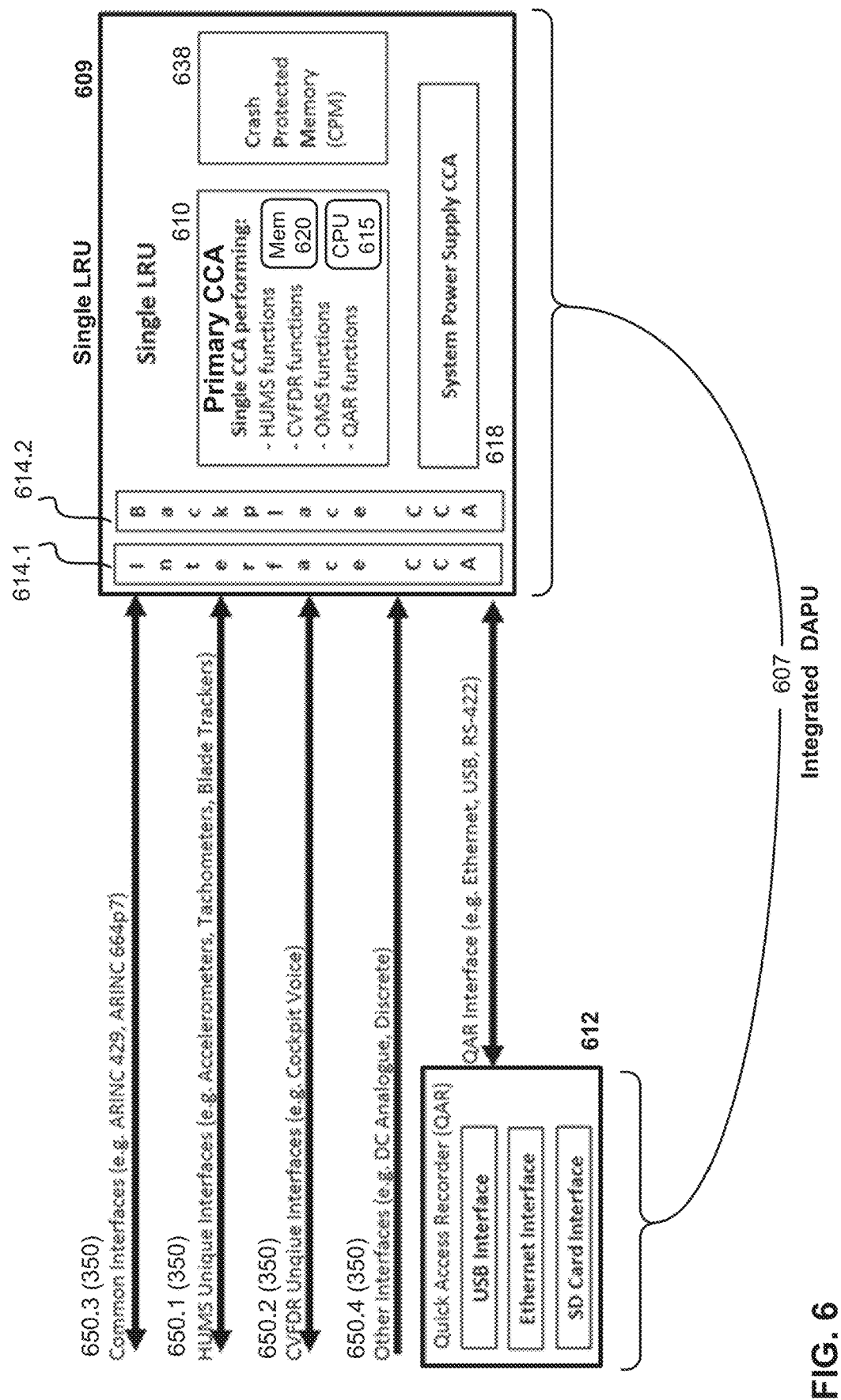

FIG. 6 provides a block diagram of an exemplary integrated data acquisition and processing unit according to the present system and method.

Figure 7:
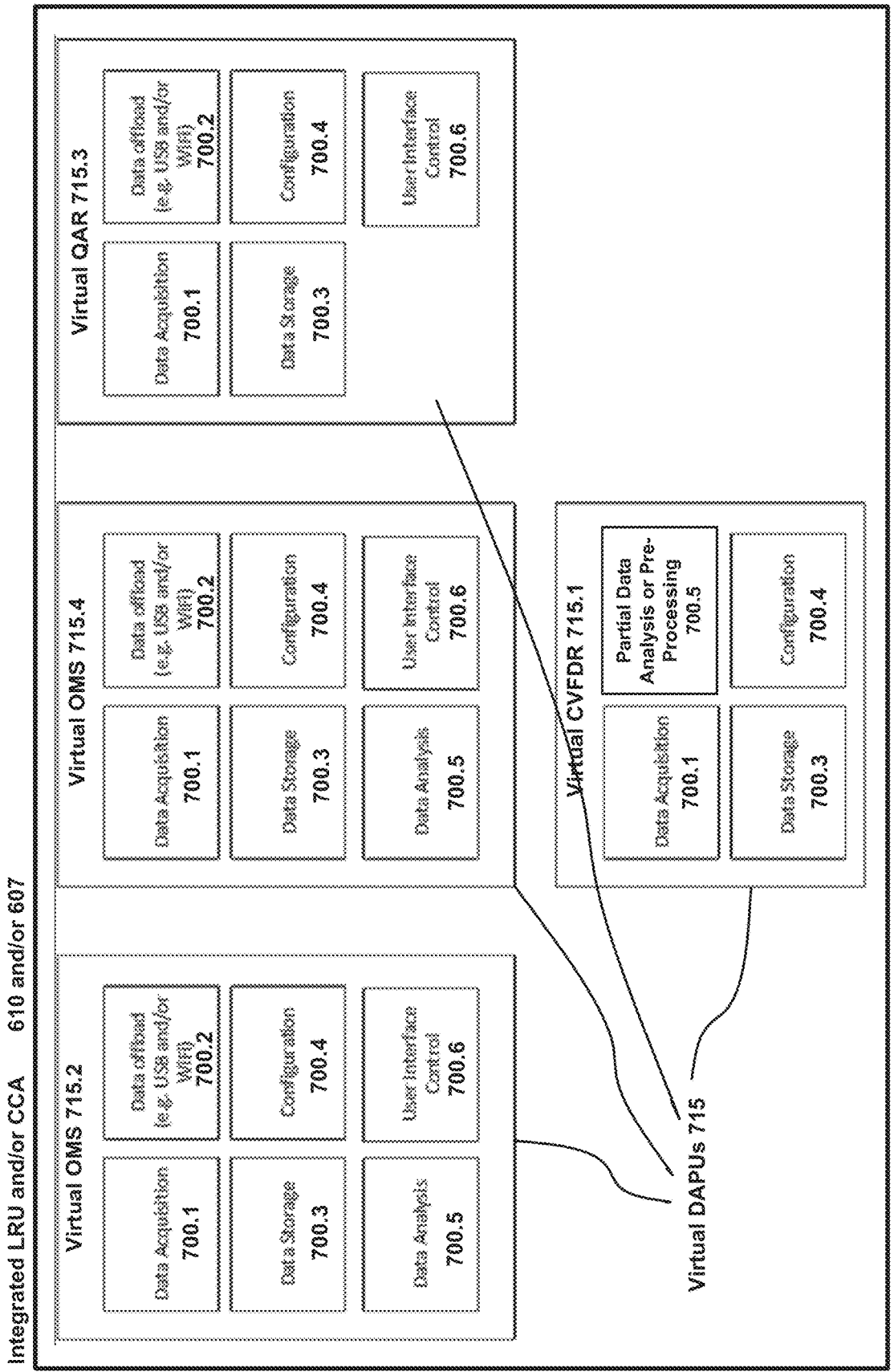

FIG. 7. illustrates several categories of system operations, application operations, software and hardware operations, and interfaces which in embodiments of the present system and method may support or be associated with implementing vehicular health management functions.

Figure 8:
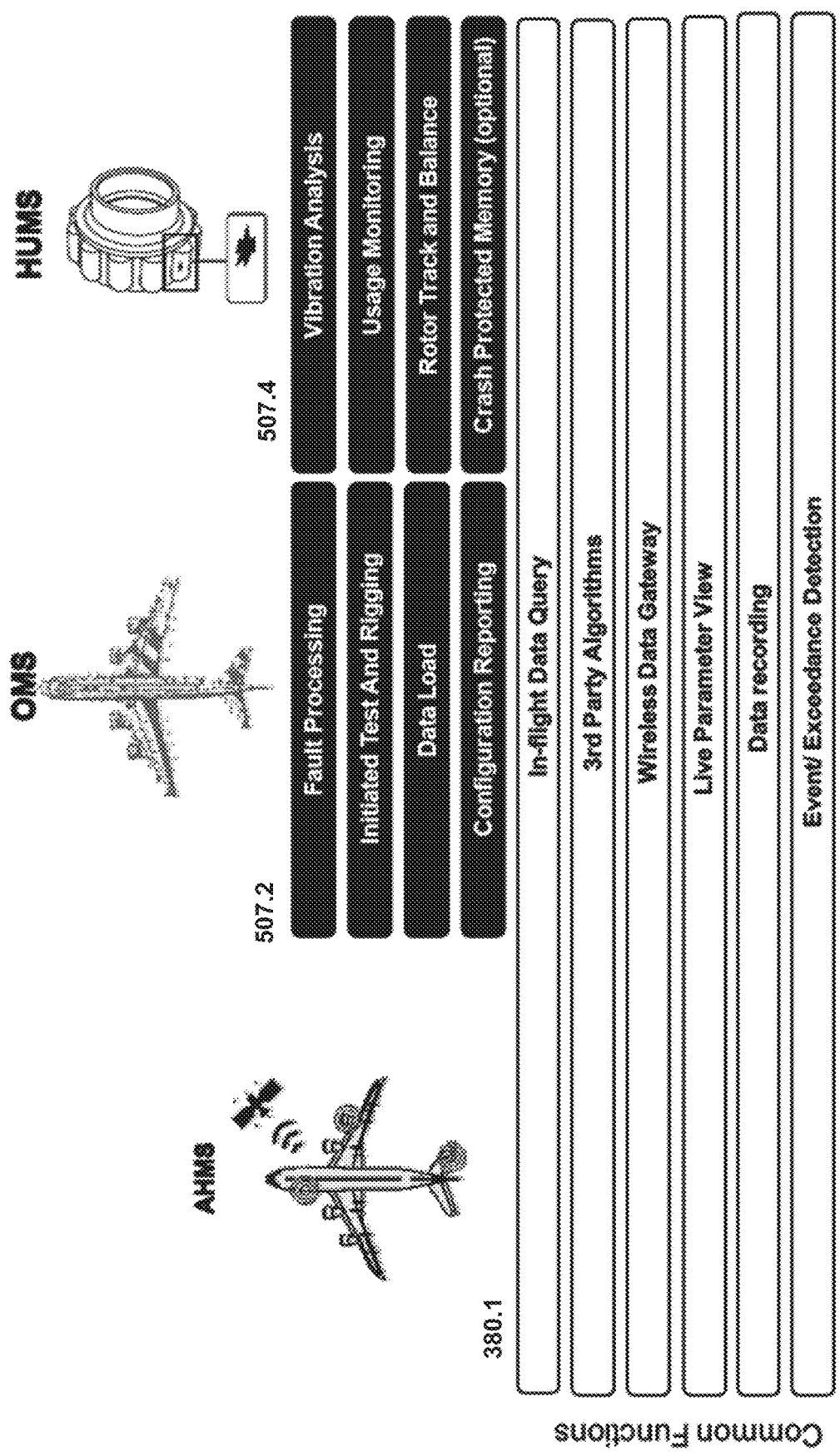

FIG. 8 illustrates an exemplary division of vehicular monitoring, analysis, reporting, and support functions which may be integrated according to the present system and method.

Figure 9:
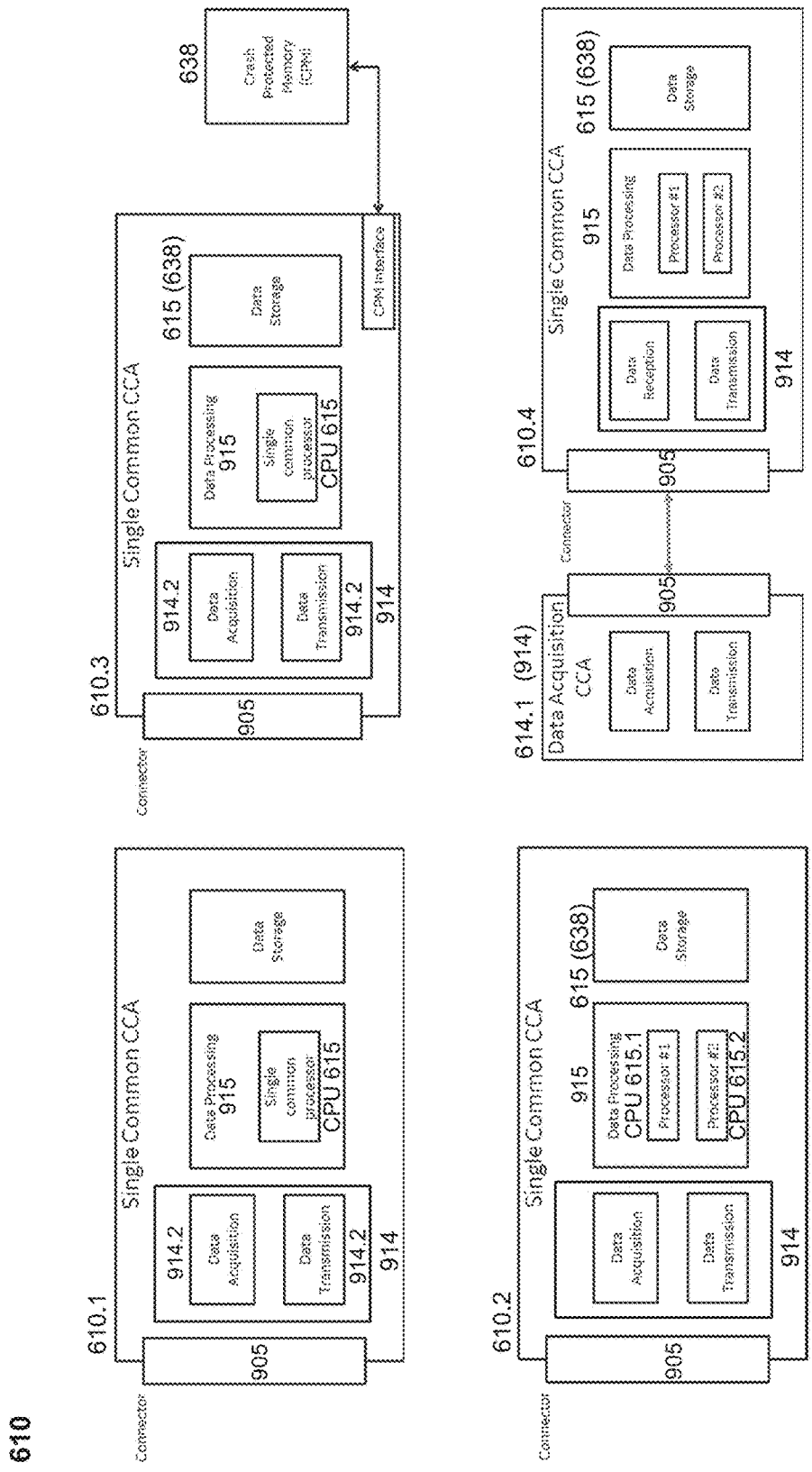

FIG. 9 provides block diagrams of four different exemplary circuit card assembly (CCA) hardware configurations for a sole, primary CCA to implement the integrated DAPU system and methods disclosed herein.

V. DETAILED DESCRIPTION OF EMBODIMENTS OF THE INVENTION

While the present invention is described herein with illustrative embodiments for particular applications, it should be understood that the invention is not limited thereto.

The following detailed description is merely exemplary in nature and is not intended to limit the system and methods, the elements or steps of the system and method, its applications, and its uses disclosed herein. Further, there is no intention for the scope to be bound or limited to or by any theory presented in the preceding background or summary, nor in the following detailed description. Those skilled in the art with access to the teachings provided herein will recognize additional modifications, applications, and embodiments within the scope thereof and additional fields in which the invention would be of significant utility.

Throughout the application, description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of processing systems. However, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

Headings used in this detailed description are present only to assist in making this document readable and easy to navigate, and should not be construed as defining or limiting.

The system and method is not limited to the embodiments described below, which are exemplary only. Rather, the full scope of the system and method is recited in the claims which follow. It will be further understood that the appended claims are themselves disclosure, and the full scope of the system and method may include elements which are recited in the claims only.

VI. VEHICLE AND SENSORS

Figure 1:
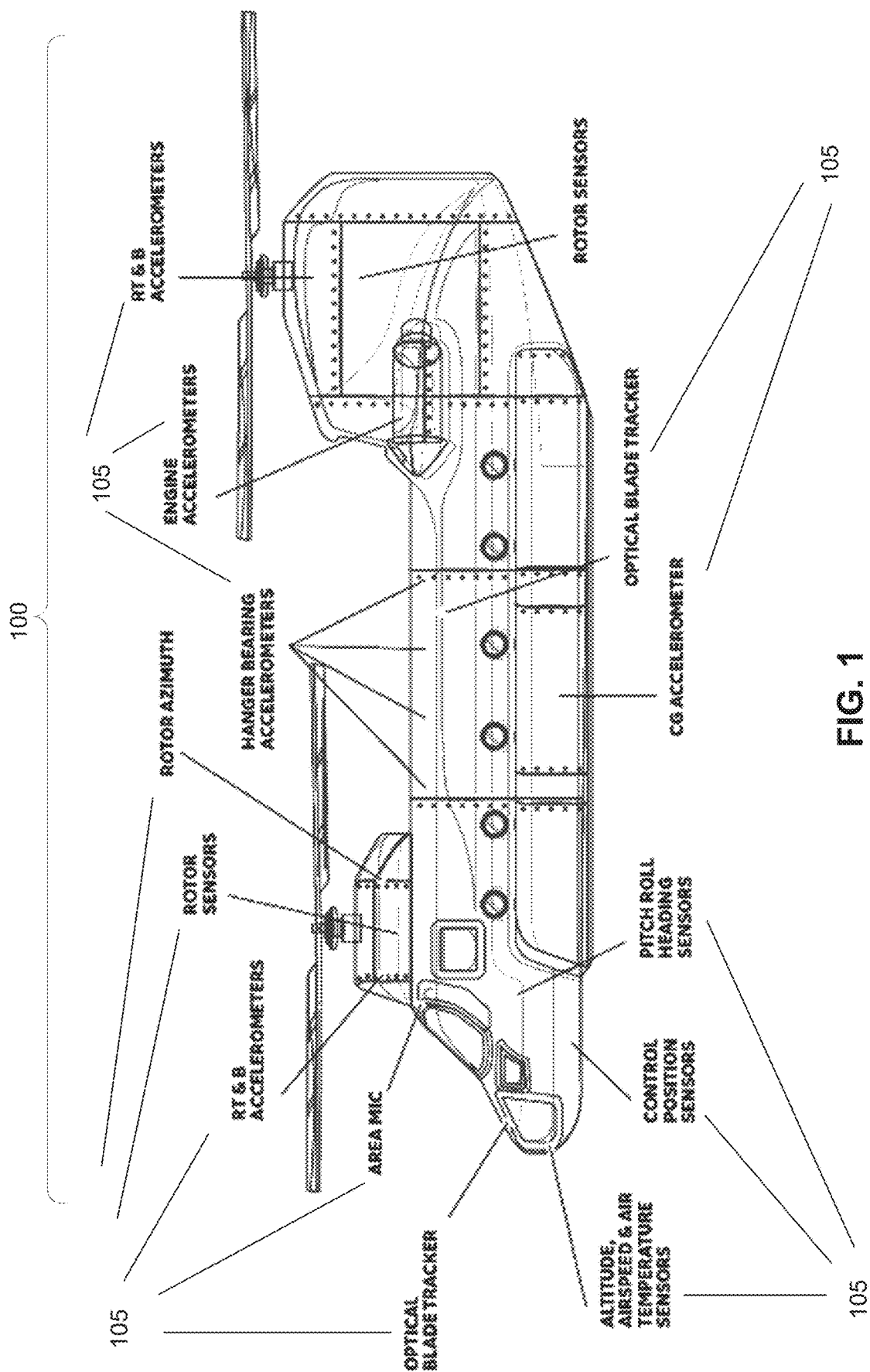
FIG. 1 illustrates an exemplary vehicular transport system ("vehicle") with exemplary sensors.

FIG. 1 illustrates an exemplary vehicular transport system ("vehicle") 100, in this instance an exemplary helicopter 100. The use of a helicopter is for purposes of illustration only, and should not be construed as limiting. Numerous elements of transport vehicles in general, and helicopters in particular, are well known in the art and will not be described here.

The vehicle 100 may include a sensor or a multitude of sensors 105, typically of different types. The sensors 105 may have elements which are electrical, mechanical, optical, and/or chemical, and may sense various environmental or vehicle phenomena or energies. The sensors 105 operate in real-time to provide a time-series view of the magnitude or intensity of the phenomena they sense, the real-time data being provided as output as either raw electrical signals with varying voltages and currents, or as digital/numeric sampled data. Exemplary placements within or along the vehicle 100 of numerous exemplary sensors 105 are shown in the FIG. 1, such as those for altitude, vehicular speed, vehicular direction and orientation, temperatures, pressures, location, vehicular acceleration, and others. Included among the sensors 105 may be vibrations sensors 110, also referred to as accelerometers 110. (Persons skilled in the art will appreciate that, as used herein, the term "accelerometer" is employed equivalently to "vibration sensors", as opposed to the types of acceleration detectors which may be employed to detect gross acceleration of the entire vehicle 100.)

Figure 2:
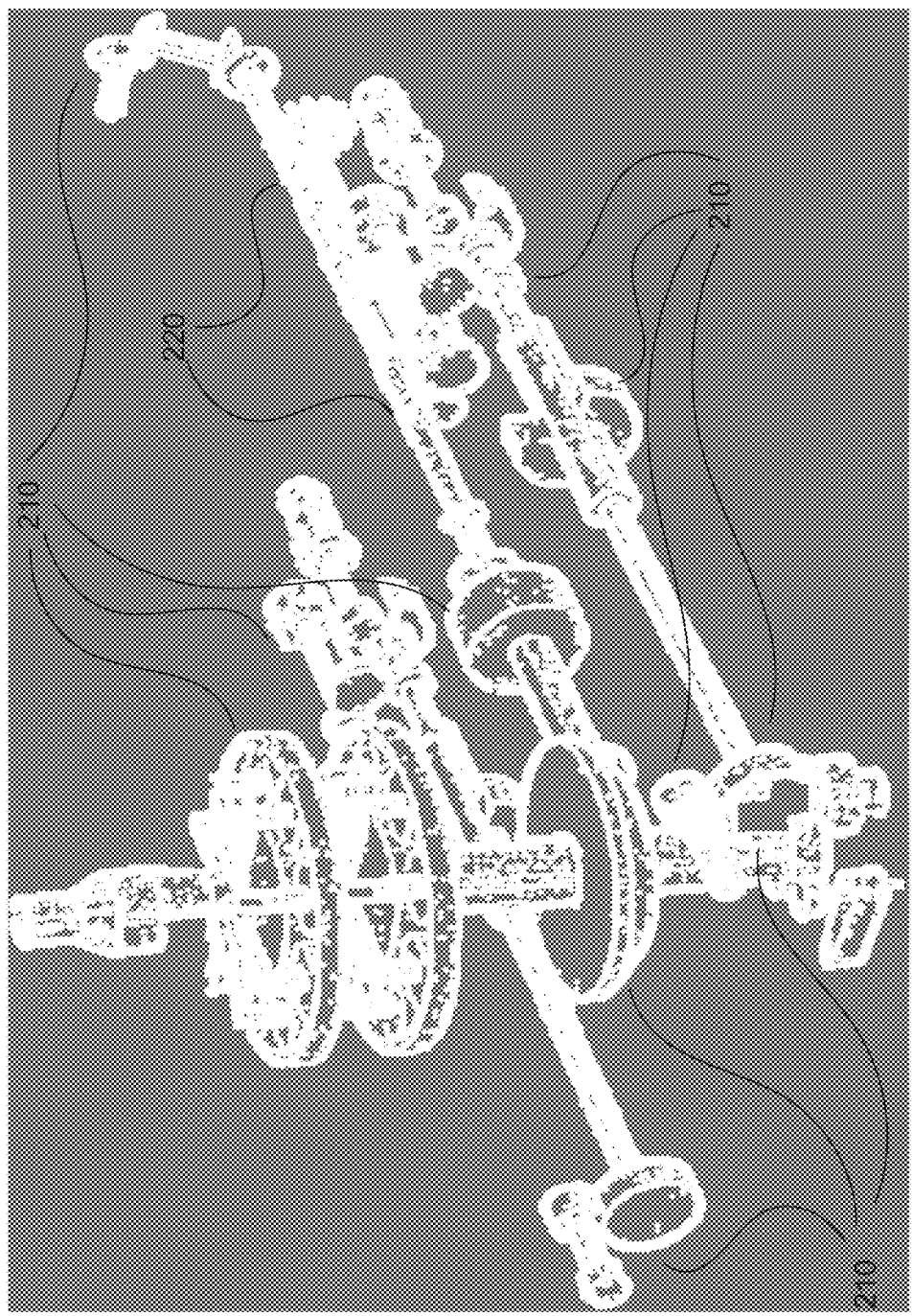
FIG. 2 illustrates an exemplary internal system of a vehicle with exemplary placements of sensors for monitoring the internal system.

Various internal sensors 105 may be employed to monitor the operations of specific internal components of vehicle 100. FIG. 2 illustrates an exemplary, complex internal mechanical element 200 of the vehicle 100, in this case an exemplary helicopter drive train 200 or gear system 200. The gear system 200 is internal to helicopter 100 (and so not shown in the view of FIG. 1), and includes gears, drive shafts and other elements which may be used to transfer power from the helicopter engine (not shown) to the helicopters rotors (not shown) and other elements within the helicopter, such as generators. Gears are typically enclosed within gear boxes 210. Drive shafts may also have shaft enclosures 220. The vibration sensors 105 associated with the drive drain 200 are generally located internally to the gear boxes 210 and shaft enclosures 220, and so are not directly visible in FIG. 2; but the vibration sensors 105 are thereby suitably situated to detect vibrations at numerous points along the drive train 200.

As will be understood by persons skilled in the relevant arts, placements of various kinds of sensors 105 may be made at multiple points among and along numerous elements of the vehicle 100 (for example, along or within the engine, not illustrated in the figures).

VII. EXEMPLARY VEHICLE SENSING/MONITORING SYSTEM ACCORDING TO PRESENT ART

Figure 3:
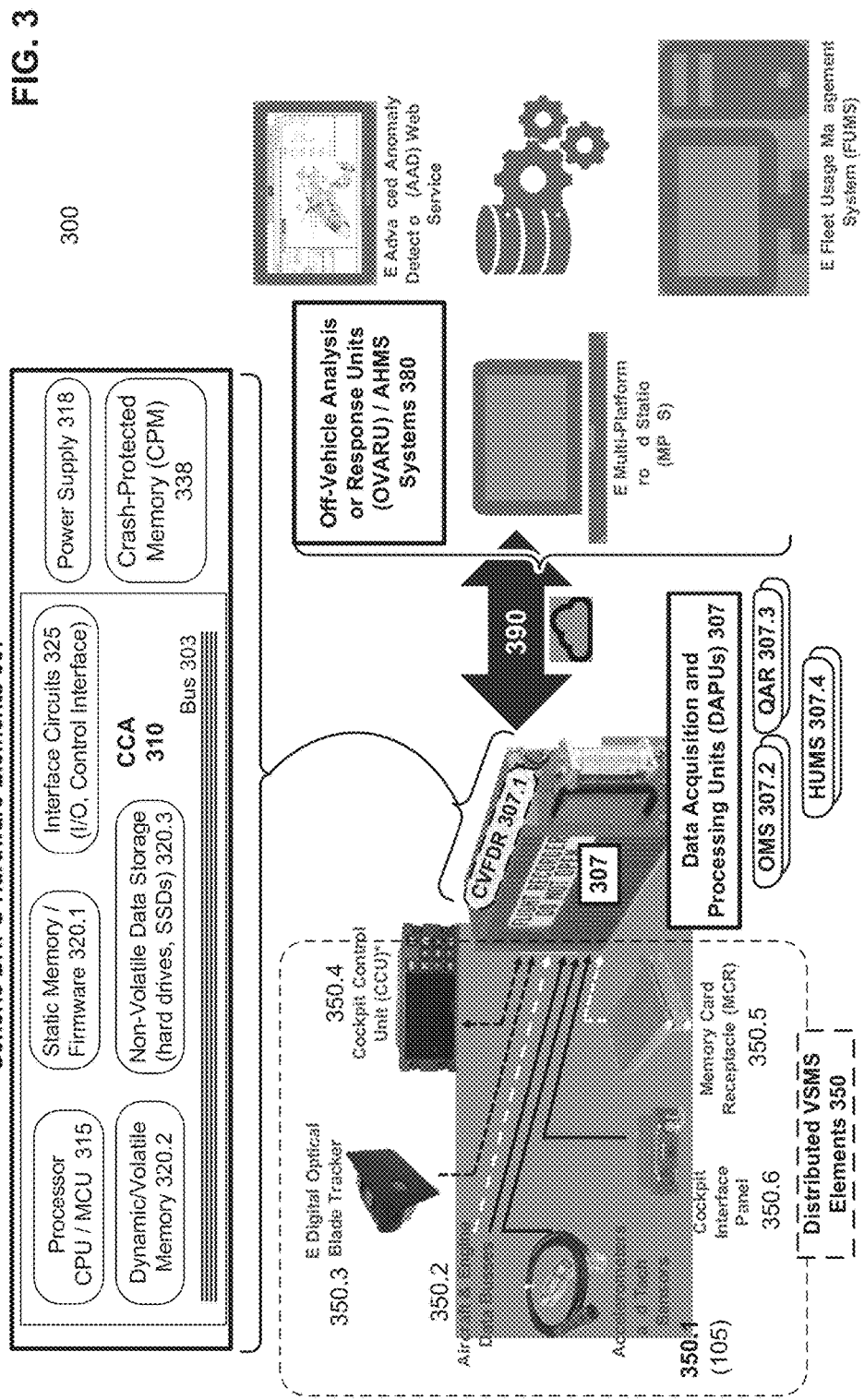
FIG. 3 illustrates an exemplary air and ground architectures of an exemplary Vehicle Sensing/Monitoring System (VSMS).

FIG. 3 illustrates an exemplary air and ground architecture of an exemplary Vehicle Sensing/Monitoring System (VSMS) 300 as may be known in the present art, and which may be associated with a transport vehicle 100 such as exemplary helicopter 100. The terms "vehicle monitoring system", "vehicle sensing system", "vehicle sensing/monitoring system (VSMS)" and "VSMS" are used interchangeably and with the same meaning below in this document. The VSMS 300 may include, for example and without limitation:

(1) Multiple Data Acquisition and Processing Units (DAPU) 307, which may for include for example and without limitation: a Crash-Survivable Cockpit Voice & Flight Data Recorder (CVFDR) 307.1, an On-board Maintenance Systems (OMS) 307.2, Quick Access Recorders (QAR) 307.3, and a Health & Usage Monitoring/Management Systems (HUMS) 307.4. The DAPU(s) 307 function as the real-time processing and data storage cores of the VSMS 300;

(2) One or more Vehicular Distributed VSMS Elements 350, which may include a variety of sensors 105/350.1 distributed throughout the vehicle 100, as well as other elements 350.*n*; and (3) One or more Off-Vehicle Analysis or Response Units (OVARU) 380, which may operate either in real-time (receiving real-time flight/transit data from the vehicle 100), or which may be used after-the-fact for post-flight/post-operations/post-event analysis of the performance of vehicle 100.

Some of these OVARU 380 may include Aircraft Health Monitoring/Management Systems (AHMS). Aircraft Health Monitoring/Management Systems provide analytics for improved fleet-wide vehicular maintenance and management, including for example and without limitation: improved aircraft utilization, improved aircraft reliability, improved flight on-time services, cost optimizations, fleet utilization trend analysis, optimized aircraft maintenance scheduling (for example, predicting the optimal time/extent of aircraft repair to maximize safety and minimize downtime), cruise and landing analysis (fuel burn, flight profiling), and other analytics for improved vehicular fleet safety, reliability, and profitability.

Further details of some of elements (1), (2), and (3) above are provided immediately below.

Data Acquisition and Processing Unit (DAPU): As illustrated schematically in the callout in FIG. 3, and in one exemplary embodiment, a DAPU 307 may include, for example and without limitation:

(a) a circuit card assembly (CCA) 310, which may also be known in the art as a motherboard 310, which typically holds and interconnects various microchips 315/320/325;

(b) volatile and non-volatile memory or storage 320.2/320.3, which together enable at the hardware level the operations of the DAPU 307 and also enable the operations of the present system and method. A CVFDR 307.1 in particular may include a crash-protected memory (CPM) 338 which may be integrated into the unit 307.1 or may be separate from but attached to the unit 307.1.

(c) a power supply 318, which may be mounted on CCA 310 or may be a separate element within the DAPU 307;

(d) a hardware processor 315, also known as a central processing unit (CPU) 315 or microcontroller unit (MCU) 315, which provides for overall operational control of the DAPU 307. This includes but is not limited to receiving data from sensors 105, and possibly modifying some operations of sensors 105 via various application specific integrated circuits (ASICs) 325;

(e) Static memory or firmware 320.1.1 for storing non-volatile operational code, including but not limited to operating system code, computer code for locally processing and analyzing data from sensors 105, and computer code which may be used specifically to enable the DAPU 307 to implement the methods described in this document and other methods within the scope and spirit of the appended claims. CPU 315 may employ the code stored in the static memory 320.1.1 to implement the methods described in this document and other methods within the scope of the appended claims;

(f) Interface circuits 325 may perform a variety of tasks, including data and control exchanges with sensors 105, as well as input/output (I/O) tasks, network connection operations, control of the bus 303, and other tasks generally known in the art of processing systems. Interface circuits 325 may also control or interface with non-volatile data storage 320.3.

Interface circuits 325 may also support such functions as external input/output (for example, via USB ports, an Ethernet port, or wireless communications, not illustrated in the figure); a control interface for a cockpit interface panel 350 and/or a cockpit control unit (CCU); addressing and receiving data from various aircraft and engine data buses 350; and storing data in memory card receptacle (MCR) 350;

(g) Volatile memory 320.2, such as dynamic RAM (DRAM), may be used to temporarily store data received from the sensors 105. Volatile memory 320.2 may also be used to temporarily store some or all of the code from static memory 320.1, and also for temporarily storing processed sensor data which is generated by the hardware processor 315 based on the data received from sensors 105.

(h) Non-volatile data storage 320.3 provides long-term storage for sensor data, which may include some raw sensor data recorded over time; but typically includes processed (and thereby condensed) sensor data. Non-volatile storage may take the form of hard disk drives, solid state drives (including flash drives and memory cards), recording on magnetized tape, storage on DVD or similar optical disks, or other forms of non-volatile storage now known or to be developed;

(i) A system bus 303 may serve to transfer data and messages between elements of motherboard 310, and between motherboard 310 and various other sensors, microchips, and controllers of DAPU 307;

(j) Above it is indicated that a DAPU 307 contains internal memory 320.1/320.2. In some embodiments, a DAPU may have or be connected to/coupled with one or more memory receptacles or storage receptacles (MCRs) 350.5 configured to contain the memory 320.1/320.2 or storage 320.3, or in some embodiments to contain supplementary, backup, or additional memory 320.1/320.2 or storage 320.3, which can be inserted and removed via an exterior access port of the MCR 350.5.

Ports and connectors: Not shown in FIG. 3, but present somewhere on the surface of the DAPU 307, may be ports and connectors, such as USB ports, Ethernet ports, and various specialized connectors and ports for connecting distributed HUMS elements 350 to the DAPU 307.

In some embodiments of the present system and method, some Vehicle Sensing/Monitor (VSMS) elements 350 may communicate with the DAPU 307 via wireless communications, for example on-board WiFi or Bluetooth connections, or other wireless connections. The DAPU 307 may have antennas and/or internal wireless circuitry (not shown in the figure) to enable such wireless data communications.

Vehicle Sensing/Monitoring System (VSMS) Elements: FIG. 3 also illustrates a variety of exemplary VSMS elements 350 which are typically part of or integrated into the vehicle 100, and which are connected to the DAPUs 307 via wires, cables, optical fibers, or possibly wireless means. These may include, for example and without limitation, one or more sensors 350.1/105; aircraft and engine data buses 350.2 to deliver data to and transmit analyzed sensor data results from the DAPU 307; one or more blade trackers (or, for example, aircraft wing operations sensors) 350.3; a cockpit control unit 350.3, and a cockpit interface panel 350.6.

The details of these and other possible vehicular distributed HUMS elements 350 are beyond the scope of this document, and are not presented here.

Off-Vehicle Processing Systems: The VSMS 300 may include one or more off-vehicle analysis or response units (OVARU) 380. These may communicate with the DAPUs 307 via wireless connections, or via wired data connections or cloud data connections once the vehicle 100 is post-transit (for example, on the ground and in a hangar). Several exemplary off-vehicle processing systems 380 are illustrated in FIG. 3, but many others may be envisioned as well. Such OVARUs 300 may operate either in real-time (receiving real-time flight/transit data) from the vehicle 100, or which may be used after-the-fact for post-flight/post-operations/post-even analysis of the performance of vehicle 100.

The details of such OVARUs 380 are beyond the scope of this document, but it will be noted that in typical embodiments, an OVARU 380 may:

(i) be used after-the-fact for post-flight/post-operations/post-event analysis of the performance of the vehicle 100; or be used in real-time (receiving real-time flight/transit data) to support flight operations or large-scale fleet operations;

(ii) be implemented as software on a general-purpose computer, though specialized computers may be employed; and (iii) are supported in their analysis by the sensor data obtained from the vehicle via the one or more flight recorders 307.

VIII. LEGACY DAPUS AS SEPARATE LINE REPLACEABLE UNITS

DAPUs 307 may include, for example and without limitation:

Onboard Maintenance Systems (OMS) 307.2—An OMS provides for centralized vehicle maintenance; reports failures, isolates and diagnoses complex system faults; provides for asset management and software loading; provides configuration/time on wing reporting; supports general aircraft condition monitoring; and provides full flight data recording, configurable analytics, and automatic data offload (wired/wireless).

Health and Usage Monitoring Systems (HUMS) 307.4—Provide on-board condition monitoring for the airframe, engines, drive train, rotor system(s), and avionics to enable early detection of faults.

Quick Access Recorders (QAR) 307.3—Provides recording of flight data for routine download, either to removable media (for example, flash drives) or wireless download. They provide no analysis or limited analysis of data on aircraft. (Data analysis is performed on ground for Flight Operations Quality Assurance (FOQA) and other purposes.)

Cockpit Voice and Flight Data Recorders (CVFDR) 307.1—Provides recording of flight data and cockpit audio for crash/incident investigations, recorded to a Crash Protected Memory (CPM). Has high mechanical/heat survivability requirements, and is normally a "fit and forget" element. Although data is sometimes downloaded for analysis, normally only when an incident occurs. In legacy systems, DAPUs 307 are typically implemented as distinct line replaceable units (LRUs) 407—one for OMS 307.2, one for HUMS 307.4, and so on.

Persons skilled in the relevant arts will appreciate that any one, single line-replaceable unit (LRU) 407 may be understood as an integrated, multi-component electronic system performing a specified functionality or group of functions; in an LRU 407, the parts or components are so structurally arranged or conjoined so that the single LRU 407 is removable and replaceable at the field level in a single slot or receptacle, or is attachable to and removable from a single slot or connector of a larger electronic system such as a cabinet or backplane (not shown in the figures). The cabinet or backplane in turn typically provides for mechanical attachment of, and electronic (or optically) communicative coupling of, multiple LRUs into a larger system. The cabinets or backplanes may provide their own communications and electrical buses to service multiple LRUs, and the connect the multiple LRUs with other parts of a total system, such as a vehicle.

In some cases, a backplane or cabinet may be configured to accept only a single LRU 407, but the single LRU 407 is thereby still operative for easy installation and replacement. In some instances, an LRU includes as a component an exterior enclosure or box (made for example of metals, plastics, polycarbonates, etc.) to contain and mount the interior electronics, along with suitable mechanical attachments and exterior electrical/communications connectors mounted on the exterior enclosure or box. The exterior enclosure may include display elements or other user-interface elements for the interior electronics. The details of LRU enclosures, if any, are not generally discussed further herein.

Vehicles such as helicopters and other aircraft employ LRUs 407 to provide ready upgrade or maintenance (through full LRU replacement, as necessary) for specified electronic and processing functions, such as the functions of different types of DAPUs 307.

FIG. 4 provides a block diagram of four separate Data Acquisition and Processing Units (DAPUs) 307 implemented as four separate Line Replaceable Units (LRUs) 407 as part of a VSMS 300, according to an exemplary legacy system and method for aircraft monitoring and maintenance.

It will be apparent that each LRU 407 requires its own circuit card assembly (CCA) 310, its own power supply 318, and its own interfaces 410 (which may include interface circuits 325). This entails hardware redundancies since, traditionally, the VSMS systems 300 consist of four separate LRUs 407 on a vehicle. Further, to perform their functions, wiring has to be established between each of the four LRUs 407 and the other vehicular distributed VSMS elements 350 (including sensors 105/351.1 on the vehicle 100) with which each LRU 407 needs to interface; this results in additional cabling and wiring.

In practice, in vehicles 100 with four separate LRUs 407, the separate LRUs 407 may be provided from four different suppliers/manufacturing companies, which results in the vehicle operators/maintainers having to learn how to use and maintain four different sets of support software and hardware.

IX. INTEGRATED DAPU FOR INTEGRATED VEHICLE HEALTH MANAGEMENT (IVHM)

Health Management Functions: Referring now to FIG. 5, the exemplary DAPUs 307 described in this document, have common or typical health management functions 507. Some exemplary health management functions 507 (HMFs) are listed in FIG. 5, which also apportions various functions within circles according to various associated-but separate DAPUs 307 on separate LRUs 407 which typically perform those functions.

For example, a CVFDR 307.1 may perform CVFDR functions 507.1 such as data recording, voice recording, and (in some CVFDRs) some limited data analysis functions. An exemplary OMS 307.2 may support OMS functions 507.2 such as central maintenance, asset management, event detection, data analysis, and data recording. An exemplary HUMS 307.4 may support HUMS functions 507.4 such as usage monitoring, event detection, data analysis, data recording, RTB (return to base), and power-train health. A QAR 307.3 typically provides little data analysis, and instead mainly supports the QAR function of data recording 507.3.

Embodiments of the present system and method may also recognize and support generalized health management functions 507.9 which may include, for example and without limitation, configurable health analytics, usage monitoring, event detection, data recording, and virtual QAR functions. These generalized health management functions 507.9 may be implemented, in part, as an element of the Off-Vehicle Analysis or Response Units (OVARU) 380, discussed above, including for example Aircraft Health Monitoring/Management Systems (AHMS) for improved fleet-wide vehicular maintenance, usage scheduling, and management (also discussed above).

In an embodiment of the present system and method, the OMS functions 507.2 and HUMS functions 507.4, as described above, as well as other DAPU functions 507, are carried out on a single line replaceable unit (LRU) 609. In an embodiment of the present system and method, the OMS functions 507.2 and HUMS functions 507.4, as described above, as well as other DAPU functions 507 are carried out only by, or substantially only be, the electronics of a single circuit card assembly (CCA) 610, which may consist of the electronics needed for data acquisition, processing, storage and transmission. See FIG. 6 below for further discussion.

In an embodiment, the present system and method, is implemented not only via physical/structural integration and consolidation of DAPU elements in a single LRU 609 and/or on a single primary circuit card assembly 610. The present system and method may also consolidation of formerly distributed, possibly redundant software modules (according to legacy systems) into single or fewer software modules which support multiple combined functions 507.

It will be seen from the exemplary functions 507 listed in FIG. 5 that many functions are common to two or more DAPUs 307. For example, event detection, data analysis, and data recording may be performed by both an HUMS 307.4 and an OMS 307.2. In conventional systems, these methods are therefore performed redundantly in both an HUMS 307.4 and an OMS 307.2. Similarly, in legacy systems a separate HUMS 307.4, an OMS 307.2, and a CVFDR 307.1 may all support recording and analysis of various data, with each DAPU 307 requiring its own software. In an embodiment of the present system and method, consolidated software on a single CCA 610 may support data recording and analysis in support of HUMS functions 507.4, OMS functions 507.2, and CVFDR functions 507.1.

In an alternative embodiment of the present system and method, some of the functions 507, such as data acquisition including a minimal amount of initial data processing (referred to herein as pre-processing), may happen remotely (for example, at the sensors 105); the remotely pre-processed, digitized data may then be transmitted to a common CCA 610 for further processing, storage, and transmission.

In this document, the combined functions 507 may be referred to for brevity and equivalently as "comprehensive health management functions 507" (CHMF 507), "integrated functions 507", "HUMS/OMS functions 507"; it being understood that CVFDR functions 507.1, QAR functionality 507.3, and other configurable health management functions 507.9 may be included as well.

Integrated Health Management Hardware and Software: In various embodiments, the present system and method integrates the health management functions 507 via integrated hardware in a single integrated DAPU 607.

In an embodiment of the present system and method, the software which performs the comprehensive health management functions 507 runs on a single common CCA 610 in the single, integrated DAPU 607. In an embodiment, the present system and method may use shared memory areas 620 and mailboxes for internal communications between software modules. In an alternative embodiment, separate memory areas/mailboxes may be employed for separate functions. In various embodiments, the single CCA 610 may consist of one hardware processor 615 to execute the comprehensive health management functions 507, or it may consist of two or more hardware microprocessors 315 that distribute the functions between them. The single CCA 610 may have a system bus (not shown in the figure) to communicatively couple the processor 615, the memory 620, and other ASICS (not illustrated) required for operations.

Persons skilled in the relevant arts will appreciate that hardware processors 615 are available with varying levels of processing power (measured for example by such parameters as clock speed, operations per second, and specific types and ranges of microinstructions which are supported); and similarly that varying amounts of memory 620 may be provided (measured for example in megabytes, gigabytes, or terabytes). The present system and method is implemented with a primary CCA 610 having a hardware microprocessor of a sufficient processing power, and a memory of a sufficient storage capacity, to reliably implement the comprehensive set of VHM functions 507.

In an embodiment, the present system and method may also have a data source (e.g. an ARINC 429 digital databus) that is used by both the integrated comprehensive health management functions 507. In an embodiment, the present system and method has a data transfer mechanism (for example, a removable memory card such as SD card or an external Wi-Fi router) that is used and shared by integrated comprehensive health management functions 507.

A QAR 307.3 is typically a device that receives data over a digital interface (e.g. RS-422, ARINC 429, Ethernet) and records it in an industry standard format (e.g. ARINC 717 or 767 for aviation) to a removable media device (e.g. SD card). Since the integrated comprehensive health management functions 507 already require a means to achieve data upload and download from the system, the addition of a QAR function 507.3 in the present system and method only requires removable storage media so that some of the data recorded to be removed is in an industry format.

The present system and method may also build on the above-defined system by also integrating crash survivable Cockpit Voice and Flight Data Recorder (CVFDR) functions 507.1. Functions 507.1 of a CVFDR typically include data acquisition, storage, processing and recording specifically to a crash survivable memory device (which is typically armored and contains thermal management compounds in order to survive the potentially extreme environmental conditions). In one embodiment of the present system and method, at-least the data processing functions 507.1 of a CVFDR are performed on the same common CCA 610 as the HUMS functions 507.4 and OMS functions 507.2.

There may be on a single hardware processor 615 that runs the OMS, HUMS and CVFDR software or software modules 700.*n* (see FIG. 7 below), or on multiple processors on a single CCA 610 whose functions are integrated and/or coordinated via shared memory 620 and a suitable operating system.

In an embodiment, the present system and method may employ a unitary data source (e.g. an ARINC 429 digital databus) that is used by the CVFDR, HUMS and OMS functions.

In an embodiment, the present system and method may also include a version where a common suite of ground software is utilized to manage the HUMS, OMS, CVFDR and QAR systems.

The present system and method offers a way to improve safety and reduce maintenance burden by integration of HUMS, OMS, and optionally CVFDR and QAR systems. Traditionally, and as discussed above, these HUMS/OMS/CVFDR/QAR systems consist of two-to-four separate LRUs (Line Replaceable Units), with vehicular wiring established between each of the two-to-four LRUs and the other systems and/or sensors 105 on the vehicle. However, there are common or substantially similar interfaces that each of the HUMS/OMS/CVFDR/QAR systems requires; therefore combining them into a single LRU eliminates one-to-three of the sets of wiring for each of the common interfaces.

With legacy systems which utilize four separate DAPUs 307 on separate LRUs 407, the separate devices often come from four different suppliers; this results in the operators/maintainers having to learn how to use and maintain four different sets of support software and hardware. In an embodiment of the present system and method, an integrated DAPU 607 for Integrated Vehicle Health Management (IVHM) is provided by a single vendor, for example, General Electric Aviation Systems, enabling simplified software and hardware support.

In embodiments, the present system and method benefits by having many HUMS functions 507.4 receive, as input, the outputs from one or more OMS functions 507.2. For example, the time and system resources dedicated to fault finding can be reduced if the HUMS software receives, as input, the output of the fault reduction rules from the OMS software (which can identify the root cause of an issue rather than report each of the individual failures).

Combining four or possibly more vehicle health maintenance functions 507, and associated hardware, into one DAPU 607 enables the support software and hardware to be reduced, providing significant cost and schedule savings in training and support for end users. Having the functional equivalent of two, three, or four DAPU systems 307 on a common hardware platform as integrated subsystems also enables closer sharing of knowledge between the subsystems; this enhances fault detection and may prevent a critical failure from occurring undetected.

FIG. 6 provides a block diagram of an exemplary integrated DAPU 607 which has a single LRU 609 and a QAR interface 612. An "integrated DAPU 607" may be referred to equivalently in this document as a "unitary DAPU 607", a "consolidated DAPU 607", or a "multi-service DAPU 607".

In one embodiment of the present system and method, the physical structure of the QAR 612 may be physically separate from the DAPU's LRU 609, with the two communicatively connected via suitable cables or wireless connection (as suggested in the figure). In an alternative embodiment, the QAR 612, with for example a suitable USB interface, Ethernet interface, SD card or flash drive interface, may be integrated into the single LRU 609.

In one embodiment of the present system and method, the crash protected memory (CPM) 683, which is associated with CVFDR functionality 507.1, may be physically integrated into the DAPU's single LRU 609 (as suggested in the figure). In such an embodiment, the entire unitary DAPU 607 with its single LRU 609 may have a case or enclosure (not shown) which is designed for extreme heat and crash protection. In an alternative embodiment, the CPM 638 may have its own crash-protected enclosed or case and may be physically separate from the single LRU 609; in such an embodiment, the single LRU 609 and CPM 638 would be communicatively linked via suitable wiring, cables, or wireless connection.

In an embodiment of the present system and method, the single LRU 609 has a single, primary, integrated circuit card assembly (CCA) 610 to support the HUMS/OMS/CVFDR/QAR functions 507. In turn, the single CCA 610 may have:

(1) A single CPU 615 to support all processing operations, or may have multiple CPUs 615 or a CPU 615 with multiple cores, or both, which may share the support of software modules that support health management functions 507. This consolidated DAPU hardware processor 615 may perform functions and have operations similar to that enumerated above with respect to hardware processor/CPU 415 discussed above (see FIG. 3).

(2) Memory 620, which may include static memory/firmware, dynamic/nonvolatile memory, and non-volatile data storage. These consolidated DAPU memory elements 620 may perform functions and have operations similar to that enumerated above with respect to memory 320.1, 320.2, 320.3 which, as discussed above (see FIG. 3), would exist as multiple memory chips on two or more separate CCAs 310 of multiple separate line units 407.

(3) Interface circuits (not shown in the figure) which may be situated on primary CCA 610 or on an interface CCA 614.1 and/or a backplane CCA 614.2 of the single LRU 609. These interface circuits may perform functions and have operations similar to that enumerated above with respect to interface circuits 325 discussed above (see FIG. 3). The integrated interface CCA 614.1 of integrated DAPU 617 provides a common connection point for interfaces with other elements 350 (see FIG. 3 above) of the total vehicle sensing/monitoring system (VSMS), such as HUMS unique interfaces 650.1, CVFDR interfaces 650.2, common interfaces 650.3, and other miscellaneous analog and discrete elements 650.4. The backplane CCA 614.2 provides for common connection of the integrated LRU 609 into a suitable socket or connection of a backplane or electrical cabinet of the vehicle 100.

The single LRU 609 of the integrated/unitary DAPU 607 may also benefit from a common, single power supply CCA 618.

FIG. 9 provides block diagrams of four different (that is, alternative) exemplary CCA hardware configurations 610.*n* for a sole, primary circuit card assembly (CCA) 610 sufficient to implement the integrated DAPU system and methods disclosed herein for an integrated DAPU 607 implemented via a single LRU 609. Also shown in the figure, as applicable, are some exemplary supplemental CCAs or other elements which may be employed as part of or in association with the integrated DAPU 607. The four embodiments illustrated are exemplary only and not limiting, and persons skilled in the art will appreciate that variations can be envisioned within the scope of this disclosure and the appended claims.

CCA 610.1 is a single circuit card assembly, for example a printed circuit board (PDB), according to the present system and method. The components illustrated may be mounted on the CCA 610.1 according to methods and processes well known in the art, or other methods to be developed in the future. CCA 610.1 has electronic components which may include, for example and without limitation:

(1) Data processing components 915, which in an embodiment includes a single CPU 615 of sufficient processing power to support all the data processing requirements of the integrated DAPU 607 for comprehensive health management functions 507 CHMF 507. In one embodiment, this may entail supporting OMS functions 507.2 and HUMS functions 507.4; and in some embodiments possibly entails supporting some or all of HUMS functions 507.4, QAR functions 507.3, and/or generalized health management functions 507.9. The CPU 615 may have one processing core or multiple processing cores.

The data processing components 915 may also include related supporting chips (not illustrated in the figure) such as FPGAs to support field-customization, memory interface chips, additional cache memory, bus management/arbitration chips, process-scheduling or process-prioritizing chips, and possibly either or both of static memory/firmware 320.1 and dynamic/volatile memory 320.2.

(2) Memory/storage, which may include non-volatile data storage (320.3) such as hard drives or SSDs; and may also include either of static memory/firmware 320.1 and dynamic/volatile memory 320.2.

(3) Data I/O elements or ASICS 914, for example data acquisition chips 914.1 and data transmission 914.2.

(4) One or more physical and/or communicatively coupled connectors 905 to connect the CCA 610.1 to the rest of the single LRU 609, including for purposes of receiving power and for data communications.

Primary CCA 610.2 is a single circuit card assembly which is similar to CCA 610. (Repeated elements will not be described again.) CCA 610.2 has a data processing unit 915 with two or more CPUs 615.*n* or hardware microprocessors 615.*n*, such as CPUs 615.1 and 615.2. Additional CPUs may be envisioned as well. In an embodiment of the present system and method, both CPUs 615.*n* may be identical or similar general purpose processors 615, which are both utilized for running software modules to support comprehensive health management functions 507. In alternative embodiment, a first CPU 615.1 may be a general purpose hardware microprocessor, while a second CPU 615.2 may be a specialized processing ASIC such as a digital signal processing (DSP) chip or other ASIC which is customized for and/or dedicated to processing tasks associated with processing data from sensors 105 for vehicles 100.

Primary CCA 610.3 is a single circuit card assembly which is similar to CCA 610. (Repeated elements will not be described again.) CCA 610.3 includes a CPM Interface 940 which is configured to be communicatively coupled with an off-CCA crash protected memory CPM 638. This enables one or more CPMs 638 (only one is shown in the figure) to be placed at different locations throughout the vehicle 100. The one or more CPMs 638 are therefore configured to maintain non-volatile storage of selected DAPU data or comprehensive DAPU data in the event that the vehicle 100 is damaged or destroyed; or in the event that the integrated DAPU 607 is destroyed or that on-board DAPU memory/storage 320 is damaged or erased.

Primary CCA 610.3 is a single circuit card assembly which is similar to CCA 610. (Repeated elements will not be described again.) CCA 610.3 includes a CPM Interface 940 which is configured to be communicatively coupled with an off-CCA crash protected memory CPM 638. This enables one or more CPMs 638 (only one is shown in the figure) to be placed at different locations throughout the vehicle 100. The one or more CPMs 638 are therefore configured to maintain non-volatile storage of selected DAPU data or comprehensive DAPU data in the event that the vehicle 100 is damaged or destroyed; or in the event that the integrated DAPU 607 is destroyed or that on-board DAPU memory/storage 320 is damaged or erased.

Primary CCA 610.4 is a single circuit card assembly which is similar to CCA 610. (Repeated elements will not be described again.) However, CCA 610.4 does not have the data I/O elements 914 of CCA 610. Instead, data acquisition elements 914.1/914.2 are mounted on a separate circuit card assembly 614 which is a separate component of the unitary LRU 609. This separate interface CCA 614 may be the same as or similar to the interface and/or backplane CCAs 614.2/614.2 illustrated in FIG. 6 above. Primary CCA 610.4 is coupled to data acquisition CCA 614 via suitable connectors 905. Primary CCA 610.4 may have two hardware processors 615, as illustrated in the figure, or just one processor 615, or more processors.

Combinations of distinct elements of the above primary circuit card assemblies 610.$n$ may be envisioned within the scope of the present disclosure and appended claims.

Integration of Card-Level System Operations on Integrated DAPU

Discussed above are vehicle health management functions 507 associated with different types of CPUs. Health management functions 507 may be consolidated in software and hardware via an integrated DAPU 607 according to the present system and method.

FIG. 7 illustrates several broad categories of foundational system operations 700, application operations 700, software and hardware operations 700, and interfaces 700 which in various embodiments of the present system and method may support or be associated with implementing health management functions 507. There may be referred to further herein collectively as "monitoring system operations 700" or "DAPU system operations 700".

DAPU system operations 700 may include, for example and without limitation, data acquisition 700.1, where the data may be acquired directly from sensors, or acquired as a result of intermediate sensor data analysis; data off-load 700.2; data storage 700.3; sensor and software configuration 700.4; data analysis 7005; and user-interface control 700.6 In various embodiments of the present system and method, system operations 700 may be implemented via ASIC-level hardware, firmware, operating system modules, and software applications or software application modules, or via combinations of two or more of the above. Specific categories of system operations may also be envisioned as application specific software or software modules 700.$n$.

Persons skilled in the relevant arts will appreciate that in legacy systems, where separate DAPUs 307 are employed (for example, a separate OMS 307.2 and separate HUMS 307.4 on separate line cards 407.2/407.4), each separate line card 407 will have its own separate hardware 310/315/320/325/303/318 to support DAPU monitoring system operations 700. Similarly, in legacy systems, where separate DAPUs 307 are employed (for example, a separate OMS 307.2 and separate HUMS 307.4 on separate line cards 407.2/407.4), an operating system and application software or software modules must be provided for each line card 407. For example, each of the OMS 307.2, QAR 307.3, HUMS 307.4, and CVFRD 307.1 must have its own operating system. Similarly, each of the OMS 307.2, QAR 307.3, HUMS 307.4, and CVFRD 307.1 must have its own hardware and software support for data acquisition 7001 or data analysis 700.5.

For purposes of understanding in FIG. 7, identical monitoring system operations 700.$n$ (for example, data acquisition 700.1, data analysis 700.5, and so on) are repeated several times in the context of several virtual DAPUs 715. Each virtual DAPU 715 may be envisioned as functioning with the framework of an integrated LRU/CCA 609/610 according to the present system and method. In an embodiment of the present system and method, monitoring system operations 700 such as data acquisition 700.1, data storage 700.3, data analysis 700.5, and others may be implemented via common hardware and common respective software modules 700.$n$ within a single integrated LRU 609 with a single primary CCA 610. The benefits may include reduction in the number of chip components, reductions in memory requirements, reduced power consumption, and more integrated software design.

For example, for purposes of data storage 700.3, an integrated LRU according to the present system and method may employ a common memory chip(s) and shared memory allocation to hold sensor data which may be employed by multiple virtual DAPUs 715. For a more specific example which is not limiting, vehicle sensor data for velocity, location, engine performance, and fuel consumption information which may be recorded/analyzed by a virtual OMS and a virtual HUMs of the integrated LRU 609 may be stored in a common memory area of a memory chip 620 on the primary CCA 610. For the same sensor data (velocity, location, engine performance data, fuel consumption), an optimized, integrated database structure (for example, suitable tables, data fields, and data retrieval operations) may be commonly shared by and employed for both OMS health management functions 507.2 and HUMS health management functions 507.4.

For another example, for purposes of data analysis 700.5, an integrated LRU according to the present system and method may employ common algorithms in a consolidated-software data analysis module 700.5 running on a single CPU 615 to analyze sensor data for both OMS health management functions 507.2 and HUMS health management functions 507.4. OMS-specific health management functions 507.2 and HUMS-specific health management functions 507.4 may, for a non-limited example, require common statistical analysis of some sensor data (such as for example and without limitation determinations of average sensor values, maximum values, minimum values, and rates of change of values) which can be processed by common, lower-level software modules, the results being input in OMS- or HUMS-specific software modules for more specific analyses.

Persons skilled in the relevant arts will appreciate that, as known in software engineering, a "single software data analysis module" may, in some embodiments, include submodules and/or multiple software processes, possibly loaded from separate application files or operating system files, which operate together to form a modular system of coordinated, related data processing functions.

Similarly, such operations as data filtering, or user-interface/GUI tools for data presentation or for tuning sensor operations, may be provided via more integrated and consistent software coding (as well as with an integrated GUI) according to the present system and method, as compared with legacy systems.

Persons skilled in the relevant arts will therefore appreciate that the multiple data acquisition functions 700.1 shown in FIG. 7, for separate virtual DAPUs 715, may in fact be integrated into a common software module, or implemented via a common software library, for an integrated DAPU 607 according to the present system and method.

Similarly, legacy systems may require separate data analysis modules/programs 700.5.$n$ for different DAPUs 307, resulting in redundant coding (possibly by multiple different vendors of DAPUs), with some potential for inconsistent coding. Various embodiments of the present system and method employ a single data analysis module 700.5 running on hardware processor/CPU 615 of primary CCA 610.

In an embodiment, the present system and method may provide a single software module, or a minimal, consolidated library of related software functions—for example, a single data acquisition module 700.1, a single configuration module 700.4, a single data analysis module 700.5—which together enable the operations of a virtual OMS, virtual HUMS, and virtual CVFDR 715 in a single, integrated LRU 609.

A further advantage of the present system and method may be support for some functions which may not be normally supported by legacy, independent DAPUs 307. For example, a legacy, separate CVFDR 307.1 may support little or no data analysis, instead storing only or mainly raw sensor data. By contrast, in embodiments of the present system and method, an integrated DAPU 307 already supports extensive on-board data analysis; therefore, in some embodiments of the present system and method, it is readily possible to transfer selected, processed sensor data and selected high-level analysis (for example, real-time analysis of airframe stresses or engine performance) to the physical crash-protected memory 638 associated with a virtual CVFDR 715.1.

Persons skilled in the relevant arts will appreciate that the functional/modular divisions illustrated in the figures are exemplary only, and some functional/modular elements may have some overlap in function, or be consolidated into single modules. In other embodiments of the present system and method, alternative or modified functional/modular divisions may be employed. For example, data acquisition 700.1 and data storage 700.3 may be combined into a single software module, or may be distributed over more than two software modules.

For another example, data analysis 700.5 may be divided into multiple modules or multiple processing layers, for example a first software layer for real-time summary or statistical compression of real-time data from a single category of sensors 105; a second software layer for extraction or identification of patterns or anomalies in first-layer data; and a third software layer for identification of system or environmental patterns, issues, or problems which may be identified based on data from multiple different types of sensors 105. Thus, additional and alternative modular functional divisions for processing vehicular sensor data may be envisioned within the scope of the present system and method.

FIG. 8 illustrates another exemplary view of vehicular monitoring, analysis, reporting, and support functions, such as OMS functions 507.2 and HUMS functions 507.4, which may in legacy systems be provided by via a separate OMS DAPU 307.2 and a separate HUMS DAPU 307.4 with their own respective hardware and software. Thus two or more legacy systems are necessary to support, for example, an off-vehicle AHMS system (as described above). In a manner consistent with the disclosure above, exemplary embodiments of the present system and method may implement and integrate the illustrated, exemplary OMS functions and HMS functions into a single, consolidated DAPU 607 running on a single LRU 609 and/or a single primary CCA 610.

X. SUMMARY AND ADVANTAGES

HUMS 307.4, OMS 307.2, CVFDR 307.1 and QAR 307.3 are already fitted to many vehicles 100 as separate systems. The present system and method combines these functions into one integrated DAPU 607, and principally, one circuit card assembly (CCA) 610 (with the exception of the crash protected memory (CPM) 638 device for a CVFDR that is separate to the CCA but physically connected). Technical benefits to the vehicle operators and/or manufacturers include significant reductions in LRU, weight and power. The present system and method also reduced system integration activities for customers (manufacturers of aircraft and other vehicles, for example). The ability to more easily exploit cross-over functionality of modules enhances fault detection and reduce aircraft maintenance burden. A reduced hardware footprint reduces recurring costs, and also increases the ability of the present system and method to capture more aircraft functionality/data streams as compared with legacy systems.

XI. CONCLUSION

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope of the disclosure. Therefore, it is to be understood that, within the scope of the appended claims, the disclosure may be practiced other than as specifically described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It should be noted that the simulation, synthesis and/or manufacture of the various embodiments of this invention can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools).

This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets. It is understood that the functions accomplished and/or structure provided by the systems and techniques described above can be represented in a core (such as a GPU core) that is embodied in program code and can be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A data acquisition and processing unit (DAPU) for use in a transport vehicle, comprising:
   a single line-replaceable unit (LRU), wherein the single LRU is configured to receive sensor data from a plurality of sensors of the transport vehicle; and
   a single primary circuit card assembly (CCA) disposed within the MU, wherein the single primary CCA is electronically configured to provide integrated processing to implement a comprehensive set of vehicular health management (VHM) functions, the comprehensive set of VHM functions comprising:
   (i) on-board maintenance system (OMS) functions and
   (ii) health and usage monitoring/management system (HUMS) functions,
   wherein the OMS functions are configured to receive and analyze, as an input, an output of the HUMS functions and wherein the OMS functions include fault processing functions, testing and rigging functions, data loading functions, software loading functions, vehicle configuration reporting functions, data recording, and event exceedance detection,
   wherein the VHM functions further comprise non-redundant common event detection, data analysis, and data recording for the OMS functions and HUMS functions, and
   wherein the single primary circuit card assembly is further configured to include at least one module to support user-interface control, sensor configuration, and processing configuration for the OMS and HUMS functions, and
   generate, based on the OMS and HUMS functions, a visual alert to an operator.

2. The DAPU of claim 1, wherein the single primary CCA comprises a hardware microprocessor and a memory with a respective processing power and a respective memory capacity sufficient to implement the comprehensive set of VHM functions.

3. The DAPU claim 1., wherein the comprehensive set of VHM functions further comprises at least one of:
   crash-survivable cockpit voice and flight data recorder (CVFDR) functions; and
   quick access recorder (OAR) functions.

4. The DAPU of claim 1, wherein:
   the comprehensive set of 'OHM functions further comprises crash-survivable cockpit voice -and-flight data recorder (CVFDR) functions, and the DAPU further comprises at least one of:
   (a) an integrated crash-protected memory (CPM) and
   (b) an interface to connect with a CPM which is separate from the DAPU and is configured to maintain data storage upon the loss of the DAPU.

5. The DAPU of claim 1, wherein:
   the comprehensive set of VHM functions further comprises quick access recorder (OAR) functions, and the DAPU further comprises at least one of:
   (a) an integrated crash-protected memory (CPM) and
   (b) an interface to connect with a CPM which is separate from the DAPU and is configured to maintain data on removable storage.

6. The DAPU of claim 1, wherein the DAPU is further configured with a plurality of modules to support data acquisition, data storage, data analysis, and data offload for all of the functions of the comprehensive set of VHM functions.

7. The DAPU of claim 1, wherein the on-board maintenance system (OMS) functions further include fault processing functions, data analysis and data recording.

8. The DAPU of claim 1, wherein the health and usage monitoring/management system (HUMS) functions further include at least two of: vibration analysis, vehicle component usage monitoring, rotor track and balance monitoring, data recording, and event exceedance detection.

9. The DAPU of claim 1, wherein the OMS functions further comprise one or more software fault detection rules that are configured to identify a root cause based on a plurality of HUMS Output data.

10. An electronic monitoring system (EMS) comprising:
    a single line-replaceable unit (LRU); and
    a single primary circuit card assembly (CCA) disposed within the LRU, the single primary CCA comprising a hardware processor and a memory, wherein the single LRU is configured to:
    be integrated into an aft transport vehicle;
    perform a plurality of sensing, monitoring, and reporting (SMR) functions, the plurality of SMR functions comprising two or more of health and usage monitoring system (HUMS) functions, cockpit voice and flight data recorder (CVFDR) functions, on-board maintenance system (OMS) functions, wherein the OMS functions are configured to receive and analyze, as an input, an output of the HUMS functions, and quick access recorder (QAR) functions,
    wherein the SMR functions include fault processing functions, testing and rigging functions, data loading functions, software loading functions, vehicle configuration reporting functions, data recording, and event exceedance detection;
    include at least one module to support user-interface control, sensor configuration and processing configuration for the plurality of sensing, monitoring, and reporting (SMR) functions; and
    the single primary CCA comprises a data interface configured to interface with all sensing systems of the transport vehicle which are required to support the plurality of SMR functions, wherein the SMR functions further comprise non-redundant common event detection, data analysis, and data recording for the two or more functions, and wherein the LRU k further configured to generate, based on the two or more functions, an alert to an operator.

11. The EMS of claim 10, wherein the LRU further comprises at least one of:
    (a) an integrated crash-protected memory (CPM) and
    (b) an interface to connect with a CPM which is separate from the LRU.

12. The EMS of claim 10, wherein the LRU further comprises at least one of:
  (a) an integrated quick access record (OAR) and
  (b) an interface to connect with a OAR which is separate from the LRU.

13. The EMS of claim 10, wherein the on-board maintenance system (OMS) functions further include fault processing functions, data analysis and data recording.

14. The EMS of claim 10, wherein the health and usage monitoring/management system (HUMS) functions further include at least two of: vibration analysis, vehicle component usage monitoring, rotor track and balance monitoring, data recording, and event exceedance detection.

15. The EMS of claim 10, wherein the OMS functions further comprise one or more software fault detection rules that are configured to identify a root cause based on a plurality of HUMS output data.

* * * * *